Sept. 7, 1937.  A. R. THOMPSON  2,092,434
APPARATUS FOR HEAT TREATMENT OF PACKAGED GOODS
Filed June 28, 1935  2 Sheets-Sheet 2

INVENTOR,
Albert R. Thompson
BY Barth, Barth
ATTORNEYS.

Patented Sept. 7, 1937

2,092,434

UNITED STATES PATENT OFFICE 2,092,434

APPARATUS FOR HEAT TREATMENT OF PACKAGED GOODS

Albert R. Thompson, San Jose, Calif., assignor to Food Machinery Corporation, San Jose, Calif., a corporation of Delaware Application June 28, 1935, Serial No. 28,854

10 Claims. (Cl. 126—272)

The present invention relates to the heat treatment of packaged goods such, for example, as canned milk, and constitutes an improvement over the invention for which I have a co-pending application, Serial No. 22,414 filed May 20, 1935.

In the milk canning art, it is customary to pass the filled and sealed cans through a pre-heater before their introduction into the cooker or sterilizer. In the pre-heater, the temperature of the can and its contents is raised gradually so that the increase in temperature upon entry into the cooker will not be too sudden. The can, prior to its entrance into the pre-heater, is at a temperature of approximately 50 degrees Fahrenheit. The temperature within that portion of the pre-heater into which the can is first introduced should be approximately 85 degrees F., and as the can progresses through successive portions of the pre-heater, its temperature is raised gradually to approximately 210 degrees F., the initial stages of pre-heating being more rapid than the final stages. In order to insure a product of the highest quality, it is essential that the temperature in the various portions of the pre-heater be controlled with considerable accuracy. Moreover, the temperatures must be adjusted from time to time to suit the characteristics of the particular milk which is being run. The duration of exposure of the can to the various temperatures in the pre-heating process is also important, best results being obtained by raising the temperature of the can comparatively rapidly in the initial stages of the process, and then holding it at or near the maximum temperature for a considerable time during approximately the last half of its travel through the pre-heater. The initial increase in temperature, however, must not be too rapid.

The can must not be subjected, at any time, to a too rapid increase in temperature. Over-heating the walls of the can with relation to the temperature of the contained milk, by increasing the outside temperature too rapidly, causes a condition known in the art as "burn on", in which a portion of the albumen in the milk is coagulated and deposited as a film on the inside of the can. In order to prevent this undesirable result, which impairs the quality of the product, the initial temperature in the input region of the pre-heater must not be too high, the increase in temperature during the first stage of pre-heating, although more rapid than during the final stage, must not be too rapid, and the temperature in the discharge region must be sufficiently high with relation to the temperature of the cooker into which the can is introduced upon its discharge from the pre-heater. Moreover, during the travel of the can through the pre-heater, it must not pass through a region of localized high temperature such as exists in proximity to the heating means, as this would also cause the objectionable "burn on" by temporarily over-heating the walls of the can. In other words, the heating means should be positioned as remote from the can path as possible.

The quality of the product will also be impaired by too much agitation of the cans during the pre-heating process, which results in separation of the milk solids, technically known as "grain". A small amount of agitation, however, is desirable in order to insure even heating.

In the hereinafter described apparatus for carrying out the present invention, I have provided a pre-heater having a can path of sufficient length to enable the entire pre-heating process to be carried to completion and in which the can path traverses a plurality of regions of controllable increasing temperature, the initial portion of the can path lying in a region of comparatively rapid increase in temperature, and the final portion of said path lying in a region in which the temperature increases at a much slower rate, the control of the temperature in the several regions being accomplished in a novel manner. I have also provided a pre-heater in which the heating means are positioned as remotely as possible from the can path, so that no portion of said path is subjected to unduly high temperature, and in which excessive and undesirable agitation of the cans is prevented.

Although the invention is herein illustrated and described as especially adapted for the pre-heating of canned milk, it is to be understood that the principles of the invention may be applied to other purposes. It is also to be understood that changes, within the limits of the claims hereto appended, may be made in the manner of carrying out the invention and in the form, construction and arrangement of the several parts herein shown and described.

The invention will now be described more in detail with reference to the accompanying drawings, wherein is shown a preferred form of apparatus for carrying out the invention, and in which:—

Figure 8 is a side elevation of one of the exterior gate adjusting means, said means having been omitted from Fig. 1 for the sake of clearness.

Figure 9 is a transverse sectional detail, on the line 9—9 of Fig. 8, showing a portion of the sump in the bottom of the shell and one of the adjustable gates therein with its exterior adjusting means.

Figure 1:
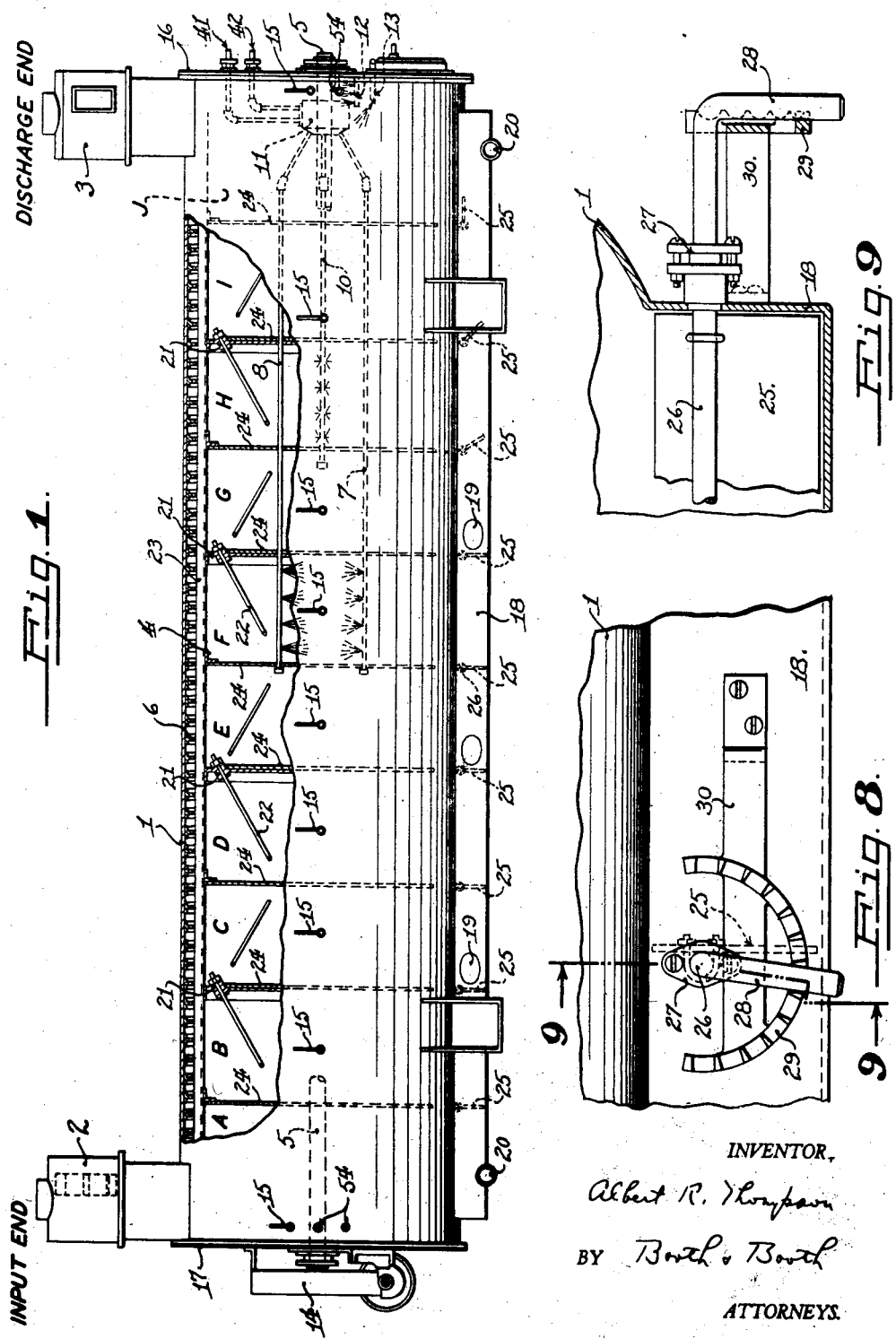
Figure 1 is a part sectional side elevation of a complete machine adapted for pre-heating canned products.
Figure 2:
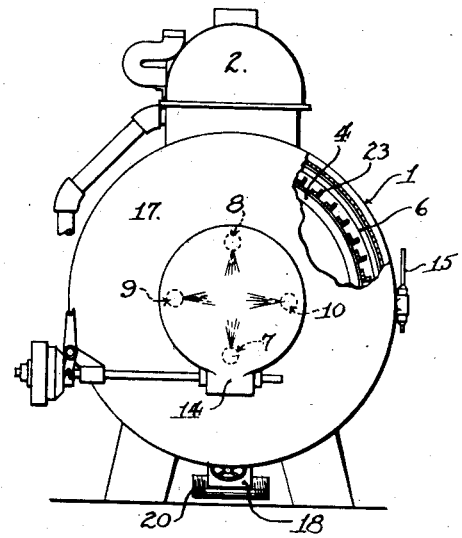
Figure 2 is a part sectional elevational view of the input and driving end of the machine of Figure 1.

The principal parts of the structure illustrated comprise a water tight cylindrical steel shell or tank 1, having at its input end a cam feed device designated as a whole by reference numeral 2, and at its discharge end a can extractor 3; a rotary can reel 4; a shaft 5 for said reel extending from end to end of shell 1 and journalled in suitable bearings in the end plates thereof; a helically trending can track 6 of T-shape cross section attached to and following the interior periphery of the shell 1; steam pipes 7, 8, 9 and 10 for heating the water in the shell; a steam header 11; steam jets 12 and 13 for heating the water at the right hand end of the shell; a driving gear indicated at 14 for rotating the shaft 5 and the reel 4; and a series of exterior thermometers 15 for indicating the temperatures at various points within the shell.

The cylindrical shell 1 is provided with end plates 16 and 17, and is formed with a longitudinally disposed sump 18 at the bottom, one function of which is to provide a place for dirt and debris to settle and to facilitate cleaning out any such matter which may in the course of time accumulate. Both the shell and the sump are provided with suitable clean-out openings 19, which are normally covered. Drain connections 20 are provided at both ends of the sump.

The shaft 5 is located at the longitudinal axis of the shell and to it are keyed several circular cast iron spiders 21 constituting the frame work of the reel 4. The spiders are diagonally braced by means of rods 22; and equally spaced around their peripheries and attached to the spiders are a series of angle iron rails 23 which extend parallel to the axis of the reel. These rails are spaced peripherally to receive cans and they are located closely adjacent, radially, to the helically trending T-iron track 6, according to common practise in machines of this type.

The stream of cans to be passed through the unit enters through the cam feed device 2 at the input end, travels in a helical path along the track 6 and emerges by way of the can extractor 3 at the discharge end of the unit.

The unit illustrated is divided longitudinally into a series of ten consecutive compartments, A to J, inclusive. These compartments are formed by means of circular imperforate transverse plates 24 which are built into the reel and rotate therewith, and by transverse baffles or gates 25 in the sump, which are vertically aligned with said plates. The function of plates 24 and the gates 25 is to restrict and adjustably control inter-compartment circulation of water, so that different temperatures can be maintained in different portions of the shell traversed by the can path, in a manner to be explained later.

The baffles or gates 25 are secured to transverse rods 26 which are rotatably mounted in the sides of the sump, so that said gates can be moved from vertical position in which they close the sump to longitudinal flow of fluid, to horizontal position in which such flow is freely permitted. In order to adjust said gates from outside the shell, each rod 26 extends through a suitable packing gland 27, Fig. 9, and is bent at right angles to form a handle 28, which travels over a fixed notched quadrant 29 secured to the side of the sump 18 by a bracket 30, Figs. 8 and 9. The handles 28 and quadrants 29 have been omitted from Fig. 1, in order that the positions of the various gates 25 may be more clearly indicated, but it is to be understood that each said gate is provided with such means for adjusting it.

Figure 6:
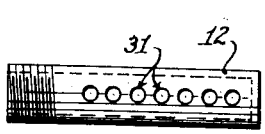
Figure 6 is an elevational view of a steam jet which is one of the details of the machine.
Figure 7:
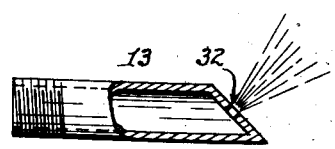
Figure 7 illustrates another form of steam jet which is likewise a constituent element of the machine.

It will be observed that steam heating pipes 7 and 8 extend through compartments F, G, H, I and J, while steam heating pipes 9 and 10 extend only through compartments H, I and J. Steam pipes 7 and 8 are perforated at the portions included in compartment F, while steam pipes 9 and 10 are similarly perforated at points within compartment H. These perforations permit steam to emerge from the pipes, and they are preferably so disposed that the steam jets are directed toward the center of the shell. The steam jets being located close to and directed toward the center, are remote from the can track, by virtue of which fact the emerging steam does not agitate the cans. This is one of the important features of this invention, since it avoids the formation of "grain" in the milk resulting from excessive agitation. Compartment J is supplied with steam by means of jets 12 and 13 which project through the end plates 16 from exterior pipe fittings 12a and 13a. These jets are illustrated in detail in Figs. 6 and 7 respectively. Both comprise short lengths of pipe plugged at their ends, but jet 12 has a row of perforations 31 along one side, while jet 13 is cut at the end at an angle of about 45° and the plug therein provided with a single aperture 32. The apertures in both jets 12 and 13 are preferably so situated that the emerging steam will be directed toward the center of the shell to avoid agitation of the cans. As indicated in Fig. 3, there are preferably two jets 12 and two jets 13, suitably spaced in the end plate 16.

Figure 4:
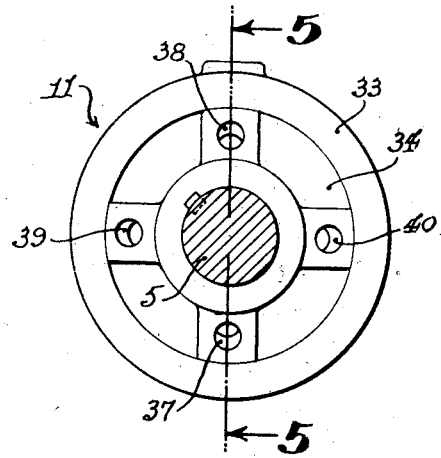
Figures 4 and 5 are enlarged end and sectional views, respectively, of a rotary steam header which is one of the details of construction of the machine, the sectional view of Fig. 5 being taken along the line 5—5 of Figure 4.
Figure 5:
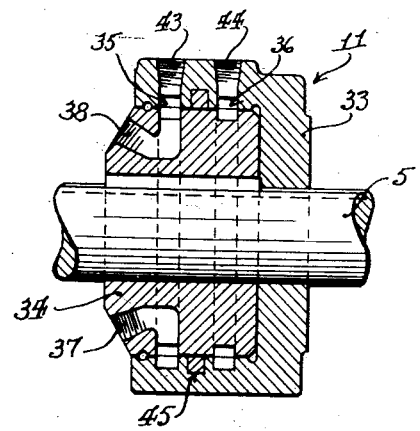

The steam pipes 7, 8, 9 and 10 are carried by the spiders 21 and plates 24 of the reel and must of necessity communicate with the external steam supply pipes through some connection which will permit the delivery of steam thereto during rotation. This is accomplished by means of the steam header 11, which is shown in detail in Figures 4 and 5. This device comprises a cast iron female member 33 and a cast iron male member 34. Member 33 is stationary, while member 34 is keyed to and rotates with shaft 5. The two members are correspondingly grooved to form annular steam channels 35 and 36, one of which is in communication with steam pipes 7 and 8 and the other in communication with steam pipes 9 and 10, these pipes being threaded into the male member at tapped openings 37, 38, 39 and 40 respectively. Steam supply pipes 41 and 42 extend through end plate 16 and connect with steam channels 35 and 36 through tapped openings 43 and 44, respectively, in the header member 33. Member 33 is provided with a packing groove 45 which contains a packing ring functioning as a steam barricade between channels 35 and 36 while permitting rotation of member 34.

Figure 3:
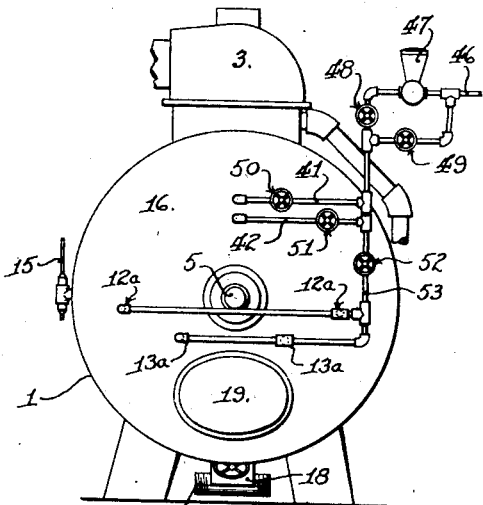
Figure 3 is an elevational view of the discharge end of the machine showing particularly the external steam pipe connections.

Steam is supplied to the unit through a steam main 46, Fig. 3, in which is preferably inserted an automatic regulator 47 in series with a shut off valve 48. There is preferably provided a bypass around the automatic regulator including a valve 49. This permits the regulator to be cut out of the line in event of its failure without interrupting the operation of the unit. The steam branch pipes 41 and 42 are provided with shut off valves 50 and 51, respectively, and a shut off valve 52 is provided in the branch pipe 53 leading to steam nozzles 12 and 13. These valves permit manual control of the steam delivered to the interior of the shell.

In the above described machine, steam is supplied directly to three compartments only, compartment F receiving steam from pipes 7 and 8, compartment H from pipes 9 and 10, and compartment J from jets 12 and 13. Compartments G and I receive sufficient heat by conduction and thermal circulation of the water from the adjoining directly heated compartments so that the temperature throughout the entire region F to J inclusive is approximately the same, or can, if desired, be made to increase slightly from F to J by manipulating the separate steam control valves 50, 51 and 52, and by adjusting the gates 25 between said compartments. Compartments A to E inclusive, forming the first half of the machine, receive heat by conduction from compartment F, and if necessary by circulation of water from the directly heated compartments, the temperature of these initial compartments being made to decrease consistently from E to A by proper adjustment of the gates 25 between said initial compartments. Thus the interior of the machine is provided with the desired range of temperature, lowest at the can input end, increasing rapidly to about the center, and thence holding or increasing slowly throughout the last half.

In operation, the shell 1 is supplied with water, preferably to a level above that of the highest steam outlet. Connections are indicated at 54 in Fig. 1, through which water, either cold or hot, may be introduced into and withdrawn from the shell, and it may also be drawn off through the drain connections 20. When the can path is filled with cans, as is normally the case in operation, there are restricted openings around the can path, between the periphery of the reel and the helical track, through which a limited flow of water can take place between adjacent compartments. When the gates 25 in the sump are open, a thermal circulation is set up, the water rising in the directly heated compartments, passing through the restricted space around the can path, descending in the cooler indirectly heated compartments, and returning to the directly heated compartments through the open sump. Such thermal circulation, if allowed to continue any substantial length of time with all the gates 25 open, would equalize the temperatures in the several compartments to an undesirable extent. However, by properly adjusting the various gates as well as by selectively controlling the various steam supply valves, the desired temperature differentials can be maintained. If all the gates are closed, there will be almost no thermal circulation of water between compartments, and the indirectly heated compartments will be heated almost entirely by conduction through the plates 24 of the reel from the directly heated compartments.

It is to be understood that the longitudinal arrangement of the heating means herein described is merely illustrative of the principle involved, and may be varied as required by circumstances. The essential principles, however, are that certain portions of the can path are directly and selectively heated, and that other portions receive no direct heating, but are heated indirectly from those portions which are directly heated. The temperatures throughout the entire can path are indicated by the thermometers 15. In operation, these temperatures are under constant observation, and are regulated as desired by selective control of the several direct heating means, and the various gates 25. Thus in Fig. 1 I have shown the gate between compartments I and J fully open, the gate between compartments H and I partly open, and the gate between compartments G and H slightly open. This setting of the gates permits thermal circulation of water between compartments G, H, I and J, and assists materially in maintaining even or slightly increasing temperature throughout the latter part of the can path. The other gates are all shown as closed, thus causing compartments A, B, C, D and E to be heated almost entirely by conduction from the directly heated compartment F. However, if it is found necessary, any of the gates may be opened, to any desired amount, to provide additional circulatory heating for any of the indirectly heated compartments.

It is to be noted that there are no heating means in the sump 18, or in any region near the periphery of the shell proximate to the can path. The position of the heating means near the axial region of the shell, remote from the can path, is important. It not only provides even distribution of heat, so that the cans are not subjected at any point to such unduly high temperature as would cause objectionable "burn on", as would be the case if the heating means were proximate to one portion of the can path, but it also avoids undue agitation of the cans tending to cause undesirable "grain" in the milk, as would ensue if they passed in proximity to the issuing steam jets, especially when said jets are under water, since the issuing steam agitates the water for a considerable distance. By positioning the jets in the axial region of the shell, and directing them inwardly, both excessively high temperature and agitation of the water are confined to a region remote from the can path.

It will be seen from the foregoing description that the desired temperature differentials between the several compartments are accomplished partly by the selective control of the valves admitting steam to the various directly heated compartments, and partly by setting up a controllable circulation of water between the directly heated compartments and the indirectly heated compartments. The controllable inter-compartment circulation is established by providing communicating apertures between compartments both along the can path and through the sump with its adjustable gates, and by the heating of the water in some compartments and the cooling of it in others by contact with the relatively cool cans.

I claim:—

1. An apparatus for heat treating packaged goods comprising a shell having a plurality of communicating fluid containing compartments formed to permit inter-compartment circulation of said fluid, means for advancing the packages successively through said compartments, means for heating the fluid in one compartment to induce said inter-compartment circulation, and means for adjustably controlling said circulation of fluid between said compartments, whereby to control the transfer of heat from said heated compartment to other compartments.

2. An apparatus for heat treating packaged goods comprising a shell having a plurality of fluid containing compartments, said compartments having communicating apertures positioned to permit inter-compartment circulation of said fluid, means for advancing the packages successively through said compartments, means for heating one of said compartments to induce said inter-compartment circulation, and means for varying the area of said apertures to control said inter-compartment circulation of fluid, whereby the transfer of heat from said heated compartment to other compartments may be controlled.

3. An apparatus for heat treating packaged goods comprising a shell having a plurality of fluid containing compartments, means for advancing the packages along a path extending successively through said compartments, said path providing a passage through which fluid may flow from one compartment to another, and said compartments having another communicating aperture for passage of fluid, means for heating the fluid in one compartment to set up a circulation between it and another compartment through said passage and said aperture, and means for controlling said other aperture to adjust the rate of said circulation and thereby to control the transfer of heat between said compartments.

4. An apparatus for heat treating packaged goods comprising a shell having a plurality of horizontally adjacent fluid containing compartments, means for advancing the packages along a path extending successively through said compartments, said path providing a passage for fluid communication between said compartments, a sump in the lower portion of said shell communicating with said compartments and providing another passage for the flow of fluid therebetween, means for heating the fluid in one of said compartments to set up a circulation between it and another compartment, a gate in said sump, and means for adjusting the effective opening of said gate to control said circulation, whereby to control the transfer of heat between said compartments.

5. An apparatus for heat treating packaged goods comprising a shell having a plurality of fluid containing compartments, a helical track extending successively through said compartments, means for advancing the packages along said track, means for heating the fluid in one compartment to induce inter-compartment circulation of said fluid, said heating means being positioned in the axial region of the helix of said track, means outside said helix providing a passage for flow of fluid between said compartments, and means for adjustably controlling said circulation to control the transfer of heat between said compartments.

6. An apparatus for heat treating packaged goods comprising a shell having a plurality of communicating fluid containing compartments, a track for the advance of packages extending through said compartments, means remote from said track for heating the fluid in one compartment, to induce inter-compartment circulation of said fluid, and means for controllably adjusting said circulation to control the transfer of heat between said compartments.

7. An apparatus for heat treating packaged goods comprising a shell having a plurality of communicating fluid containing compartments, means for advancing packages successively through said compartments, means for directly heating the fluid in some of said compartments, the number of directly heated compartments being less than the total number of compartments, said heating of the fluid causing circulatory flow thereof between the directly heated compartments and the other compartments tending to equalize the temperature of the fluid in all compartments, and means for varying the rate of said circulatory flow to control the transfer of heat thereby.

8. An apparatus for heat treating packaged goods comprising a shell having a plurality of fluid containing compartments, the fluid in different compartments being at different temperatures and said compartments having communicating apertures, whereby thermally induced inter-compartment circulation of said fluid is set up, means for variably controlling said circulation, and means for advancing the goods to be treated successively through said compartments.

9. An apparatus for heat treating packaged goods comprising a shell having a plurality of horizontally adjacent fluid containing compartments, means for advancing the packages along a path extending successively through said compartments, said path providing a passage through which fluid may flow from one compartment to another, a sump at the lower portion of said shell providing another passage for fluid and in communication with each of said compartments, means for heating said fluid in certain of said compartments whereby circulation thereof between said compartments through said passage and said sump is effected, and means for controlling said circulation.

10. In an apparatus for the described purpose, a shell having a plurality of fluid containing compartments, means for advancing packages along a path extending successively through said compartments, said path providing a passage above the bottom of the shell for the flow of fluid between said compartments, a sump extending along the bottom of said shell, each compartment opening into said sump, so that fluid may flow from one compartment to another through said sump, a movable gate in said sump, and means for varying the effective opening of said gate to control the inter-compartment flow of fluid through said sump.

ALBERT R. THOMPSON.